BRIDGE OSCILLATING ARRANGEMENT UTILIZING OUTPUT TO VARY BALANCE
Filed Sept. 11, 1959
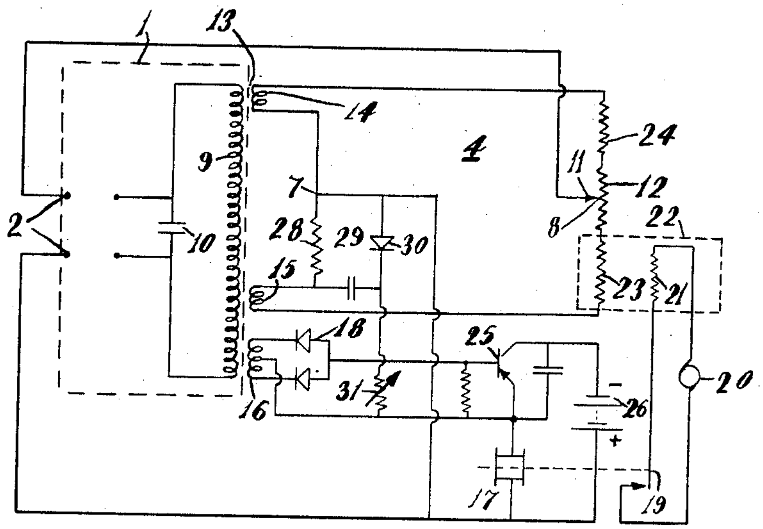
Inventor
H. Banasiewicz
By [signature]
Attys.

United States Patent Office 3,109,149 Patented Oct. 29, 1963

3,109,149

BRIDGE OSCILLATING ARRANGEMENT UTILIZING OUTPUT TO VARY BALANCE

Henryk Banasiewicz, London, England, assignor to Fielden Electronics Limited, Manchester, England, a company of Great Britain Filed Sept. 11, 1959, Ser. No. 839,311
Claims priority, application Great Britain Sept. 18, 1958
8 Claims. (Cl. 331—66)

This invention relates to electrical regulating arrangements of the kind comprising an amplifier and a balanceable bridge circuit, the condition of balance of the bridge circuit being dependent upon a factor to be regulated, the output and input circuits of the bridge circuit respectively forming input and output circuits of the amplifier and the arrangement being such that on one side of balance it is quiescent and on the other side of balance it oscillates at a frequency determined by a tuned circuit in the amplifier and means for controlling that factor in dependence upon whether the arrangement is quiescent or oscillating.

One object of the invention is to provide an improved regulating arrangement of the kind described which responds rapidly and positively to a change in the condition of balance of the bridge.

A further object of the invention is to provide an improved regulating means of the kind described in which an unduly high frequency of operation of the controlling means is avoided.

According to the invention in a regulating arrangement of the kind described one arm of the bridge includes an impedance element the impedance of which is dependent upon the current flowing through it, feedback means being provided for applying to said impedance element an unidirectional bias current dependent upon the amplitude of oscillation, the arrangement being such that the gain of the loop which includes said impedance element and said feedback means as its feedback link is greater than unity, the impedance of said impedance element changing in a direction to increase the amplitude of oscillation when the arrangement commences to change from a non-oscillatory to an oscillatory condition and in a direction to decrease the amplitude of oscillation when the arrangement commences to change from an oscillatory to a non-oscillatory condition.

One embodiment of the invention, which is suitable for operation as a thermostat, will now be described, by way of example, with reference to the partly schematic diagram shown in the accompanying drawing.

This embodiment comprises an amplifier, indicated by the rectangle 1, and a balanceable bridge circuit 4, the amplifier 1 having input terminals 2 and an output circuit including a parallel tuned circuit formed by an inductor 9 and a capacitor 10 and the bridge circuit having output terminals 7 and 8, to which the input terminals 2 are connected, the output terminal 8 being constituted by the slider 11 of a resistive potential divider 12. The inductor 9 forms the primary winding of a transformer 13 having secondary windings 14, 15 and 16. The winding 14 is connected in one of the parallel paths through the bridge between terminals 7 and 8 and the winding 15 is connected in the other parallel path through the bridge between those two terminals. For convenience, this embodiment is first described assuming that the resistor 28, capacitor 29, diode 30 and resistor 31 are omitted and that output terminal 7 is directly connected to the adjacent end of winding 15.

The windings 14 and 15 supply energy to the bridge circuit 4 from the amplifier 1, the windings being so connected that feedback to the input terminals of the amplifier 1 via winding 14 is negative and feedback via winding 15 is positive.

If an exciting potential appears at the input terminals of the amplifier 1 and the positive feedback to the input terminals of the amplifier 1 exceeds the negative feedback to those terminals by an amount equal in amplitude to and in phase with the exciting potential the arrangement will oscillate at the resonant frequency of the tuned circuit 9, 10. The gain of the amplifier 1 is high in order that the change from a quiescent to an oscillatory condition shall occur when the bridge is very close to its balanced condition and shall be substantially independent of the normal variations in that gain.

The secondary winding 16 supplies energy, when oscillation occurs, to the full wave rectifier 18, the output of which is connected in the base-emitter circuit of a transistor 25, the rectifier being so poled as to drive the emitter positively with respect to the base. The collector-emitter circuit of the transistor 25 is supplied with energy from a D.C. source 26, the negative pole of which is connected to the collector. As the emitter is biased positively with respect to the base during oscillation and is not biased at other times a large current flows in the collector-emitter circuit only during oscillation. This collector-emitter circuit includes the energising winding 17 of a relay which controls, by means of its front contact 19, the supply of energy from a power source 20 to a heater element 21 positioned in a heat zone indicated diagrammatically by the dotted rectangle 22.

A temperature sensitive resistor 23 positioned in the heat zone for the purpose of measuring its temperature and having a positive resistance-temperature coefficient is connected in the bridge circuit between winding 15 and terminal 8. A range resistor 24 is connected in the bridge circuit between the winding 14 and terminal 8 and is arranged to have a resistance equal approximately to the resistance of the resistor 23 at the middle point of the temperature range over which the arrangement is desired to operate.

The arrangement so far described operates as follows: When the temperature of the heat zone is such as to balance the bridge no oscillation occurs and the relay winding 17 is unenergised. When, however, the temperature of the heat zone falls below this value, the resistance of resistor 23 falls, the positive feedback via winding 15 increases and oscillation commences, causing relay winding 17 to become energised. The resulting closing of front contact 19 of the relay causes heat to be supplied to the heat zone by the heater element 21 until the temperature of the heat zone rises sufficiently to cause the bridge to become rebalanced. Oscillation then ceases, front contact 19 opens and the supply of heat to the heat zone is stopped. When, on the other hand, the temperature of the heat zone rises above that at which the bridge is balanced no oscillation occurs because the bridge is then unbalanced in such a direction that the negative feedback via winding 14 exceeds the positive feedback via winding 15. Relay winding 17 then remains un-energised until the temperature of the heat zone falls sufficiently to unbalance the bridge in the opposite direction. As the bridge is balanced only when the heat zone is at a predetermined temperature there is no substantial difference between the temperature at which relay winding 17 becomes energised when that temperature is falling and the temperature at which it becomes unenergised when that temperature is rising. The contact 19 is, as a consequence, operated at a frequency which is unduly high.

Considering, now, the complete circuit shown in the drawing, the bridge 4 also includes a resistor 28, the resistance of which is low, connected between the output terminal 7 and the winding 15. The resistor 28 is connected in series with a capacitor 29, the series circuit so formed being connected in parallel with a semi-conductor diode 30 so poled as to conduct in the direction from the output terminal 7. The reactance of the capacitor 29 at the frequency of oscillation is small compared with the impedance of the diode 30. So far as oscillatory currents are concerned therefore, the diode 30 is effectively connected in parallel with resistor 28. The value of the resistor 24 must, of course, be modified if the temperature at which the bridge is balanced is to remain unchanged, the modified value being the sum of the resistance of the resistor 23 at the middle point of the temperature range over which the arrangement is desired to operate and the effective resistance of the parallel connected resistor 28 and diode 30.

The terminal 7 is connected to the positive terminal of the source 26 and the common connection of the capacitor 29 and diode 30 is connected through a bias control resistor 31 to the emitter of the transistor 25. Consequently, during oscillation a bias current is applied to diode 30 in the forward direction and no bias current is applied at other times, the magnitude of this bias being dependent upon the resistance of resistor 31. The diode 30 thus has a relatively low impedance during oscillation and a high impedance at other times.

The complete arrangement operates as follows:

When the temperature of the heat zone is such as to balance the bridge no oscillation occurs and the relay winding 17 is unenergised. When, however, the temperature of the heat zone falls below this value the resistance of the temperature sensitive resistor 23 falls causing the bridge to become unbalanced in a direction to cause oscillation. The energisation of relay winding 17 is then initiated as described above. At the same time the forward bias current applied by the transistor 25 to the diode 30 causes a reduction in the impedance of the diode 30, thereby further unbalancing the bridge and, consequently, increasing the amplitude of oscillation. The diode 30 thus operates as a variable impedance element, the impedance of which is dependent upon the bias current applied to it by the feedback means constituted by resistor 31, capacitor 29 and resistor 28. The gain of the loop which includes as its feedback link the resistor 31, diode 30, capacitor 29 and resistor 28 is arranged to be greater than unity with the result that the current flowing through relay winding 17 rises from minimum to maximum at a speed which is limited only by the revelant time constants and the loop gain. The arrangement therefore responds rapidly and positively to the change in the balance condition of the bridge.

Assuming that the temperature of the heat zone 23 is below that at which the bridge circuit 1 is balanced and that this temperature is rising the arrangement will be oscillating, the resistance of resistor 23 will be increasing, and the circuit will continue to oscillate until a point is reached at which the amplitude of oscillation commences to fall. The inverse effect now occurs, the current flowing through relay winding 17 falling from a maximum to a minimum at a high speed. This fall in the relay current due to an increase in the resistance of resistor 23 occurs at a higher value of the resistor 23 than that at which the rise in the relay current occurs due to a decrease in the resistance of resistor 23 because the impedance of diode 30 is lower when the resistance of resistor 23 is rising. The magnitude of the temperature difference represented by these different values of resistor 23 may be varied by variation of the resistance of the resistor 28 or of the resistor 31. Preferably, in order to avoid errors due to the variable resistance of a sliding contact being included in the bridge circuit resistor 28 is not variable and the whole of the desired variation in the temperature difference is obtained by adjustment of the resistance of resistor 31, this latter resistor being so situated that variation in the resistance of a sliding contact has no effect on the accuracy of the bridge. The existence of this temperature difference results in the frequency of operation of the contact 19 being less than it would be if the diode 30 and the feedback means 31, 29, and 28 were omitted, the frequency of operation decreasing as the temperature difference increases. As this temperature difference increases, however, the accuracy with which the temperature of the heat zone is maintained uniform decreases and, in practice, resistor 31 is adjusted to give the best compromise between accuracy of temperature control and frequency of operation.

The arrangement may, alternatively, be arranged to oscillate when the temperature of the heat zone is above that at which the bridge is balanced by interchanging the positions of resistors 23 and 24 and in that event the supply of energy to the heater element 21 is controlled by a back contact of relay 17.

The transistor 25 and its associated circuit elements may be replaced by any suitable amplifier having a sufficient gain and providing an output current which varies in a suitable manner with the amplitude of oscillation.

The diode 30 may be replaced by any other suitable impedance of which falls as the current through it increases and vice versa. It may, for example, be replaced by the filament of a carbon filament lamp or, if the circuit is suitably modified in known manner, by one junction of a transistor.

Alternatively, the variable impedance element may, for example, be such that its impedance increases as the current through it increases and vice versa but the variable impedance element, resistor 28 and capacitor 29 must then be connected between terminal 7 and winding 14 instead of between terminal 7 and winding 15.

The rectifier 18 may also be replaced by any other suitable rectifier.

What is claimed is:

1. In an electrical oscillatory circuit including an amplifier having a feedback network coupled between its output and input, said network comprising a balanceable bridge circuit having a first impedance arm of a value which is variable in response to a variable condition to unbalance the bridge in one direction to provide positive feedback for causing oscillations of the oscillatory circuit when the value of the impedance changes in one direction from a predetermined value and to unbalance the bridge in the opposite direction when the value of the impedance changes in the opposite direction to provide negative feedback for preventing oscillations of the oscillatory circuit, impedance element included in a second arm of said bridge, and means responsive to the amplitude of oscillations in said oscillatory circuit for applying a voltage to the variable impedance element to vary the impedance of the second arm to further unbalance the bridge to cause said amplitude to rise rapidly to a maximum when oscillation commences and to reduce the unbalance of the bridge to cause the amplitude to fall rapidly to zero when the amplitude of oscillations commences to fall, the gain of the loop which includes said variable impedance element and the means for applying a voltage thereto being greater than unity.

2. An electrical oscillatory circuit according to claim 1, including a first inductor in the output of the amplifier, a second inductor in the second arm of the bridge circuit and a third inductor in a third arm of the bridge circuit having a common connection with the second arm and one output terminal of the bridge, the output of the amplifier being coupled to the input of the bridge by inductive coupling between the first inductor and the other two inductors, the first and fourth arms of the bridge being resistive.

3. An electrical regulating arrangement including an oscillatory circuit as claimed in claim 1, and control means coupled to said oscillatory circuit and responsive to the oscillatory condition thereof for changing said variable condition to control the impedance of the first arm in a direction tending to restore the bridge to balance.

4. In an oscillatory circuit including an electron discharge device having a feedback network coupled between its output and input, said network comprising a balanceable bridge circuit having a first impedance arm of a value which is variable in response to a variable condition to unbalance the bridge in one direction to provide positive feedback for causing oscillations of the oscillatory circuit when the value of the impedance changes in one direction from a predetermined value, and to unbalance the bridge in the opposite direction when the value of the impedance changes in the opposite direction to provide negative feedback for preventing oscillations of the oscillatory circuit, an impedance in a second arm of the bridge circuit, a voltage-dependent variable impedance comprising a diode coupled in parallel with the impedance of the second arm, and means responsive to the amplitude of oscillations of the oscillatory circuit for producing a unidirectional voltage for biasing the diode to vary the impedance of the second arm in a direction to further unbalance the bridge circuit upon increase in the amplitude of oscillations and to vary the impedance of the second arm in the opposite direction to balance the bridge as the amplitude of oscillations decreases.

5. In an oscillatory circuit as defined in claim 4 including further means responsive to the amplitude of oscillations to vary the condition for restoring the bridge to balance.

6. In an oscillatory circuit as defined in claim 4 in which the diode is coupled to the resistive impedance in the second arm through a blocking capacitance.

7. In an oscillatory circuit as defined in claim 4 and including a variable resistance in series with the diode for varying the bias voltage applied thereto.

8. In an oscillatory circuit as defined in claim 4 in which the means response to the amplitude of oscillations of the oscillatory circuit for producing a unidirectional voltage includes an amplifier having a gain exceeding unity, whereby the unidirectional voltage has an amplitude greater than that of the amplitude of oscillation.

References Cited in the file of this patent

UNITED STATES PATENTS

| | | |
|---|---|---|
| 2,258,128 | Black | Oct. 7, 1941 |
| 2,806,200 | Ketchledge | Sept. 10, 1957 |
| 2,922,959 | Holloway et al. | Jan. 26, 1960 |